Nov. 5, 1929.                C. E. NELSON                 1,734,043
                      HYDRAULIC FLEXIBLE COUPLING
                         Filed Feb. 9, 1928
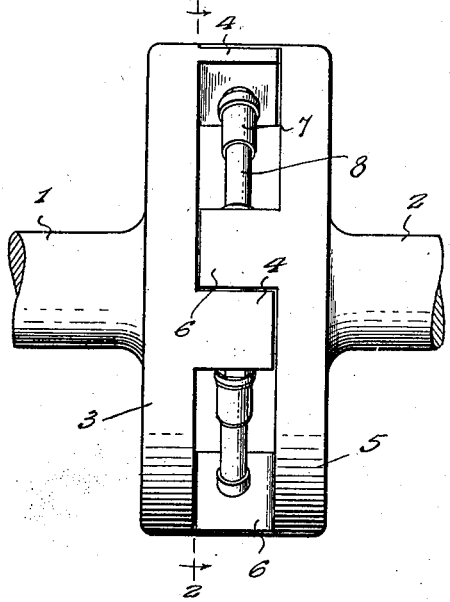
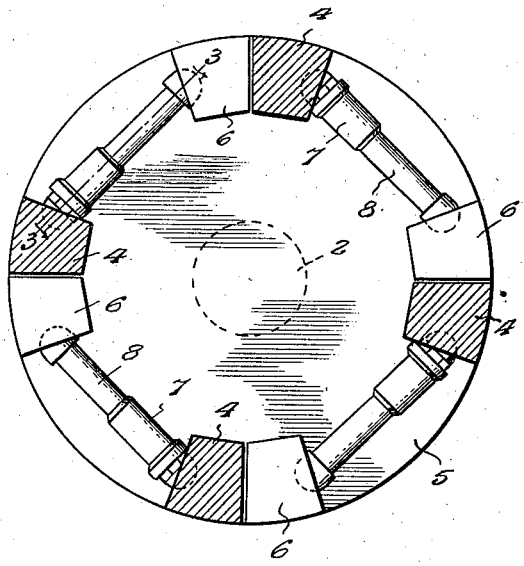
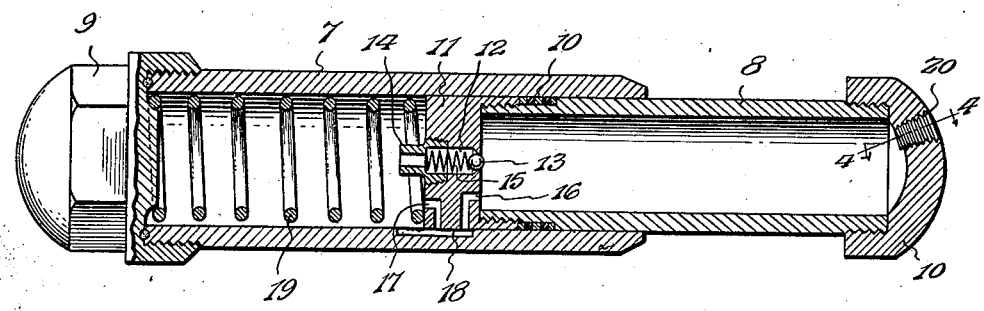
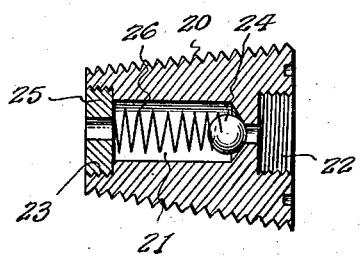
Inventor
Carl E. Nelson.
By Lacey & Lacey, Attorneys Patented Nov. 5, 1929

1,734,043

UNITED STATES PATENT OFFICE

CARL E. NELSON, OF NIAGARA, WISCONSIN

HYDRAULIC FLEXIBLE COUPLING

Application filed February 9, 1928. Serial No. 253,097.

This invention relates to yieldable coupling to gradually transmit movement and thereby obviate the strain incident to the transmission of force through a rigid connection.

The invention consists of what may be designated as a hydraulic coupling interposed between parts for transmitting power to allow for a certain amount of movement to obviate strain.

While the drawing illustrates a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is a side view of a drive and driven shaft coupled by means embodying the invention.

Figure 2 is a sectional view on the line 2—2 of Figure 1, looking in the direction of the arrows.

Figure 3 is a central longitudinal sectional view of the coupling on the line 3—3 of Figure 2 showing the parts on an enlarged scale.

Figure 4 is a detail sectional view of the filling plug on the line 4—4 of Figure 3, showing the parts on a large scale.

Corresponding and like parts are referred to in the following description and designated in the several views of the drawing by like reference characters.

The numeral 1 denotes a drive shaft and 2 a driven shaft. A disk 3 is provided at one end of the drive shaft 1 and a plurality of lugs 4 project outwardly therefrom and are equally spaced. A similar disk 5 is provided at the adjacent end of the driven shaft 2 and lugs 6 project outwardly therefrom towards the disk 3 and overlap the lugs 4. There are an equal number of lugs 4 and 6 and these lugs abut in one position, as indicated most clearly in Figures 1 and 2 of the drawings. A coupling embodying the invention is interposed between adjacent lugs 4 and 6 to provide a yielding connection in the direction of rotation of the drive shaft, so as to compensate for strain in the transmission of power to the driven shaft 2.

The coupling is shown most clearly in the enlarged sectional view, Figure 3 of the drawings, and comprises complemental members 7 and 8, each being of tubular formation, and closed at their outer ends by means of caps 9 and 10, respectively. The outer ends of the caps 9 and 10 are of rounded formation and obtain a snug fit in sockets formed in the opposing sides of the lugs 4 and 6 between which the coupling is interposed. The tubular members 7 and 8 telescope and have a hydraulic piston fit to prevent any loss of pressure. The inner or telescoping end of the member 8 is reduced and receives a packing 10 consisting of alternate rings of metal and leather. A piston head 11 is formed with a flange which is threaded upon the reduced end of the member 8 so as to confine and compress the packing 10. The piston head 11 closes the inner end of the member 8 and has a snug fit within the member 7, and is formed with an axial opening 12 which is reduced at its inner end to provide a seat for a ball valve 13. The outer end of the opening 12 is enlarged and threaded to receive a hollow plug 14 which confines a helical spring 15 which normally holds the valve 13 seated. Ports 16 and 17 are formed in the piston head 11 and open through the outer side and opposite faces thereof. A channel 18 formed in the inner side of the member 7 registers with the ports 16 and 17 in one position of the members 7 and 8. An expansible helical spring 19 is located within the member 7 and normally exerts a pressure against the piston head 11 to force the members 7 and 8 apart, thereby holding adjacent lugs 4 and 6 in abutting engagement, as indicated most clearly in Figures 1 and 2 of the drawings.

The cap 10 closing the outer end of the member 8 to which it is threaded is formed with an opening in which is fitted an externally threaded tapered plug 20, the plug 20 being formed with an axial opening 21 which is enlarged at opposite ends, as indicated at 22 and 23. The axial opening 21 is constricted adjacent its outer end to provide a seat for a ball valve 24. A ring 25 is threaded into the opening 23 and confines an expansible helical spring 26 which operates to normally hold the valve 24 seated. A suitable liquid is supplied to the member 8 through the valved plug 20, the parts supplying the liquid being threaded into the opening 22, as will be readily appreciated. The valve 24 opens inwardly, but closes outwardly, thereby preventing the escape of any liquid or pressure.

The members 7 and 8 are nearly or quite filled with liquid, oil being preferred. When the couplings are in place the springs 19 are under tension and sustain the load and function as cushioning means for relieving strain and absorbing shock. When the load overcomes the resistance represented by the combined tension of the springs 19, the members 8 slide within the members 7. This movement is slow because the valve is seated and the liquid is bypassed slowly from the member 7 to the member 8 through the passage formed by the port 17, channel 18 and port 16. The return of the member 8 to normal position is quick, because the liquid passes rapidly from the member 8 to the member 7 through the ports 16 and 17 and the channel 18 and the opening formed in the piston 11 by the unseating of the valve 13.

Having thus described the invention, I claim:

1. A hydraulic coupling comprising tubular members having a telescopic arrangement and piston fit and closed at their outer ends, a piston head at the inner end of the inner member provided with ports opening through opposite faces and the outer side thereof, and having an opening extending therethrough, a valve within the opening of the piston head and normally seated and adapted to automatically open when the members move outwardly, there being a channel in the wall of the outer member in communication with the ports formed in the piston head, and an expansible helical spring within the outer member and normally urging the members apart.

2. A hydraulic coupling comprising similar tubular members, the one fitting snugly within the other and having its inner end reduced, caps closing the outer ends of the members, one of the caps having a valved opening therein, a piston threaded upon the reduced end of the inner member and having an opening therethrough and ports in opposite faces extending through the outer side thereof, there being a channel in the wall of the outer member in communication with the ports formed in the piston, a valve within the opening of the piston head and normally seated and adapted to automatically open when the members move outwardly, and an expansible helical spring within the outer member and normally urging the members apart.

In testimony whereof I affix my signature.

CARL E. NELSON. [L. S.]